United States Patent Office 3,544,143
Patented Dec. 1, 1970

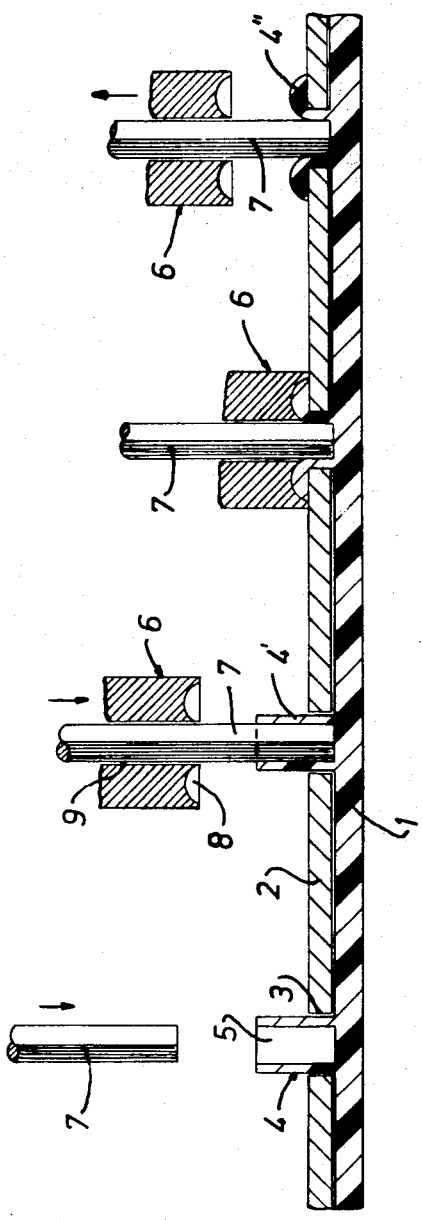

3,544,143
RIVETABLE PROJECTIONS
Jarl-Erik S. I. Ohlsson, Hannebergsgatan 2F,
Solna, Sweden
Filed May 23, 1968, Ser. No. 731,450
Claims priority, application Sweden, June 2, 1967,
7,731/67
Int. Cl. F16b 19/04
U.S. Cl. 287—189.36                                    2 Claims

ABSTRACT OF THE DISCLOSURE

This invention relates to a rivetable projection, a tool for riveting same, and a method of performing the riveting operation. The rivetable projection which primarily is intended for riveting an apertured detail to an article of plastic or like material, is integral with the said article and is adapted to extend with a clinchable end portion through an aperture provided in said detail. The rivetable projection has an outer dimension corresponding to the aperture in which it is received, and a central longitudinal recess extending approximately up to the level of the projection-carrying surface of the article, the thickness of the projection material preferably being less than one half the thickness of that portion of the article where the projection is provided. The device for riveting the projection consists of a guide pin insertable into the recess of the projection, and a preferably heated tool annularly surrounding the guide pin and movable relative thereto, said tool having an annularly concave engaging surface adapted to engage the upstanding clinchable portion of the rivetable projection and to clinch it. According to the method, the guide pin is introduced into the recess, whereupon the tool associated with the guide pin urges the clinchable portion of the projection down against the surface of the apertured detail which is to be secured by means of the projection. After the clinching operation, the tool is first retracted from the clinched portion of the projection, and then the guide pin is withdrawn from the recess.

The invention relates to a rivetable projection, especially for riveting an apertured detail to an article of plastic or like material, the projection being integral with the plastic article and adapted to extend with a clinchable end portion through an aperture provided in said detail.

Heretobefore solid pins or projections have been used which, after having been passed through the apertures in the detail to be attached to the plastic article, have been clinched at their free end in the manner of a rivet by means of a suitable and often heated tool against the surface portion surrounding the aperture in the detail. However, it has frequently happened that insufficient wall thickness of the plastic article, for instance when the article has been in the form of a panel, has caused a less attractive sinking of the material on the rear side of a wall or panel opposite the pin or projection. Experience has shown that there is a direct connection between the occurrence of such sinking of material and the relationship between the wall or panel thickness and the cross-sectional area of the pin which is to be rifeted, and that in order to prevent such sinking the cross-sectional area or thickness of the pin should not exceed approximately one half of the thickness of the plastic article to which the pin or projection is adhered. As a result, a large number of slender rivetable pins or projections had to be provided at points where actually but a few pins or projections of larger cross-sectional area would have been necessary.

The invention has for its object to provide a rivetable projection by which any sinking of material is eliminated and which can be given a suitable shape for the holding. According to the invention, the rivetable projection has an outer dimension corresponding to the aperture in which it is received, and a longitudinal recess extending approximately up to the level of the projection-carrying surface of the plastic article, the projection being integral with the plastic article and the wall thickness of the tubular or sleeve-like projection preferably being less than one half the thickness of that portion of the plastic article where the projection is provided.

A preferred embodiment of the rivetable projection according to the invention and a a tool for riveting said projection and also a method of performing the riveting operation will be described more in detail in the following, reference being had to the accompanying drawing which is a cross-sectional view of a plastic panel provided with rivetable projections, an apertured metal strip to be adhered to the plastic panel, and riveting tools shown in different positions during a riveting operation.

In the drawing, 1 is the plastic panel which may be a portion of the back of a moulded binder, and 2 is the metal strip which is provided with apertures 3 and may constitute the fastening strip for the prongs of the binder. The rivetable projections or pins 4 are mounted during the manufacture of the plastic panel and extend through the apertures 3 in the metal strip 2.

According to the invention, the projections 4 have a central longitudinal recess 5 extending approximately to the level of the upper side of the plastic panel 1. The wall thickness of the tubular or sleeve-like projections thus made integral with the plastic panel is less than one half of the material thirkness of the panel 1, as will be seen from the drawing. The length of the projections 4 is so chosen that a portion 4' thereof which is intended for the riveting operation stands up above the strip 2.

Prior to the riveting operation, a guide pin 7 associated with a riveting tool 6 is introduced into the recess 5 in a direction toward the bottom of the recess 5. During the following riveting operation, the tool 5 which in the illustrated embodiment is displaceable relative to the guide pin 7 and is provided with heating means (not shown), is urged downwardly against the upper end 4' of the projection 4 which extends through an aperture in the strip so that the said end 4' will be heated and clinched against the upper face of the strip 2. As will be seen from the drawing, the engaging surface 8 of the riveting tool 6 has an annular concave recess which upon clinching compresses the end of the projection to form an annular rivet head 4" around the guide pin 7. During the clinching operation, that part of the material of the projection which is at a level with the aperture 3 in the strip 1, will be compressed so that the aperture will be completely filled out. After the clinching operation, the tool 6 is retracted and the guide pin is allowed to remain in the recess for a certain time so that the plastic material can be transformed from plastic to rigid form and flow of material inwardly toward the centre of the recess 5 is avoided. For this reason, it is important that no heating of the guide pin 7 occurs, and to this end an annular gap 9 is provided between the tool and the guide pin.

The tool 6 need not necessarily be displaceable relative to the guide pin 7 but can be stationary in relation thereto. The guide pin is allowed to project beyond the tool to such an extent that its end will reach down toward the bottom of the recess 5 in the final phase of the clinching operation. The subsequent retention of the guide pin 7 in the recess until the plastic material has solidified can be accomplished by removing the tool so far from the clinched annular rivet head 4" that the end portion of the guide pin remains at a level with the aperture 3 in the strip 2.

The invention is not limited to the embodiment described above and illustrated in the drawing, but can be modified in several ways within the scope of the appended claims.

What I claim and desire to secure by Letters Patent is:
1. An article of plastic material for riveting of an apertured detail thereto comprising:
   a plastic material having thin portions,
   a plurality of tubular or sleeve-like rivetable projections, each extending from a said thin portion, said projections being hollow and integral with said plastic material and adapted to extend with a clinchable end portion through an aperture provided in the detail, each of said rivetable projections having an outer dimension corresponding the aperture in which it is received, the wall thickness of said tubular or sleeve-like projection being less than half the thickness of said thin portion and the depth of the opening of said tubular projection being so proportioned that said projection has an imperforate bottom surface which lies substantially at the level of the surface of the plastic material thin portion surrounding each said projection.

2. The article of plastic material of claim 1, wherein:
   said plastic material is a thin plastic sheet material substantially equal in thickness throughout to the thickness of said thin portions.

References Cited

UNITED STATES PATENTS

| | | | |
|---|---|---|---|
| 2,705,346 | 4/1955 | Schlabach et al. | 264—249 |
| 3,110,069 | 11/1963 | Jones | 85—8 |
| 3,069,962 | 12/1962 | Rapata | 85—82 |

FOREIGN PATENTS

| | | | |
|---|---|---|---|
| 172,176 | 8/1952 | Austria | 264—249 |
| 1,009,617 | 11/1965 | Great Britain | 264—249 |

EDWARD C. ALLEN, Primary Examiner

U.S. Cl. X.R.

85—37